Sept. 2, 1941.  M. S. RANDALL  2,254,856
LAMINATED INSULATION MATERIAL
Filed Dec. 6, 1937  2 Sheets-Sheet 2
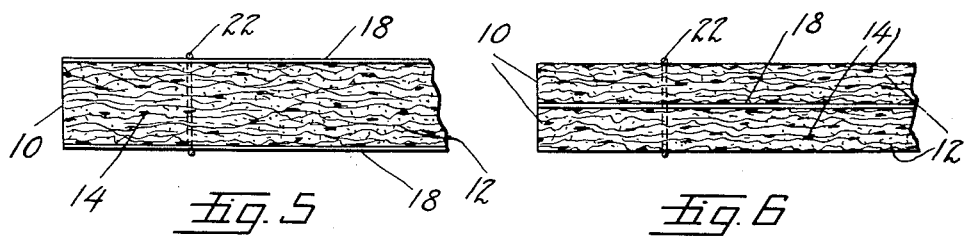
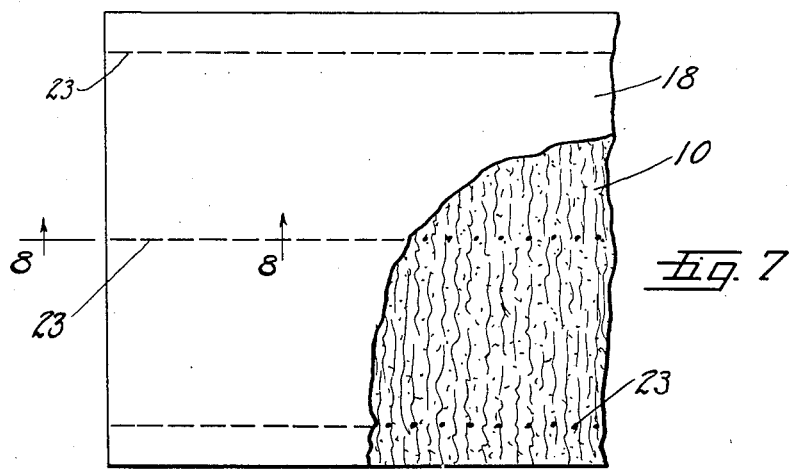
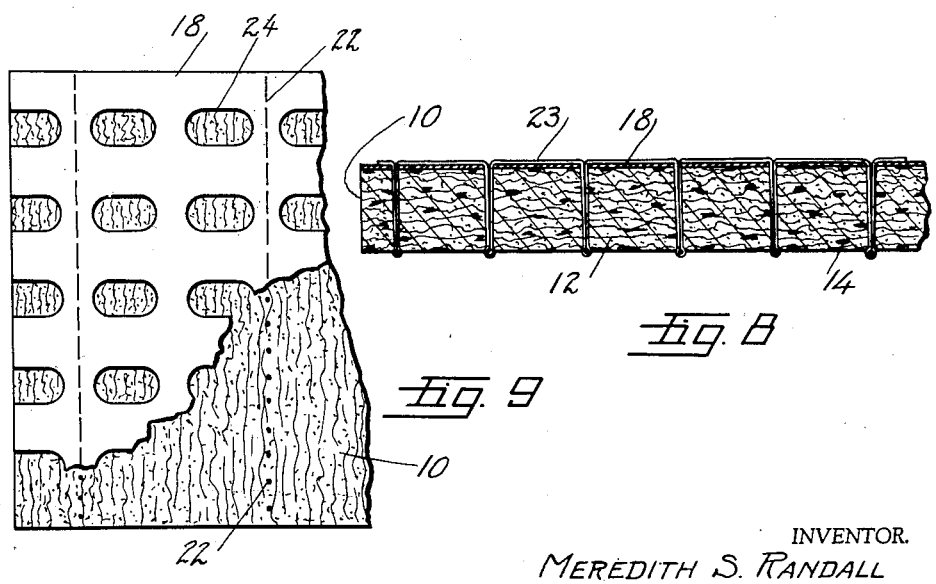
INVENTOR.
MEREDITH S. RANDALL
BY Parker & Burton
ATTORNEYS.

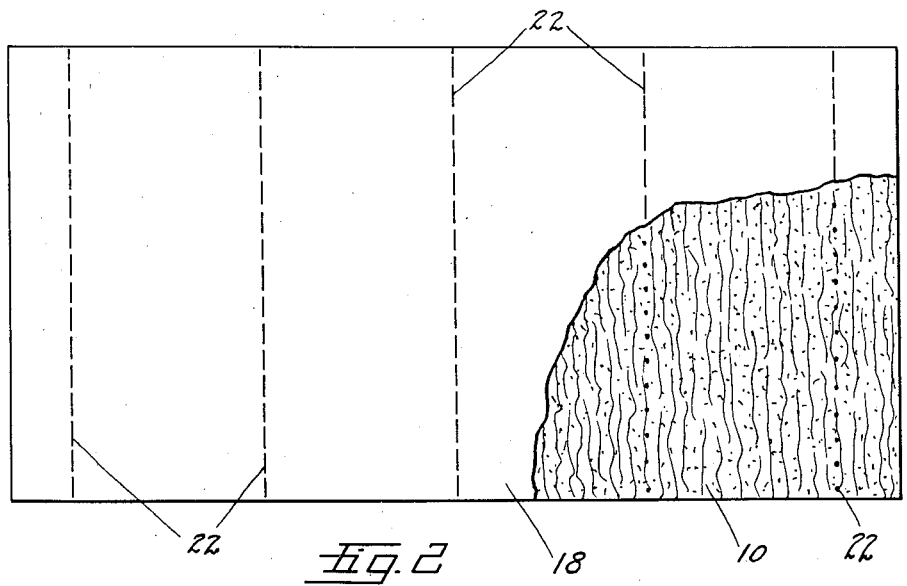
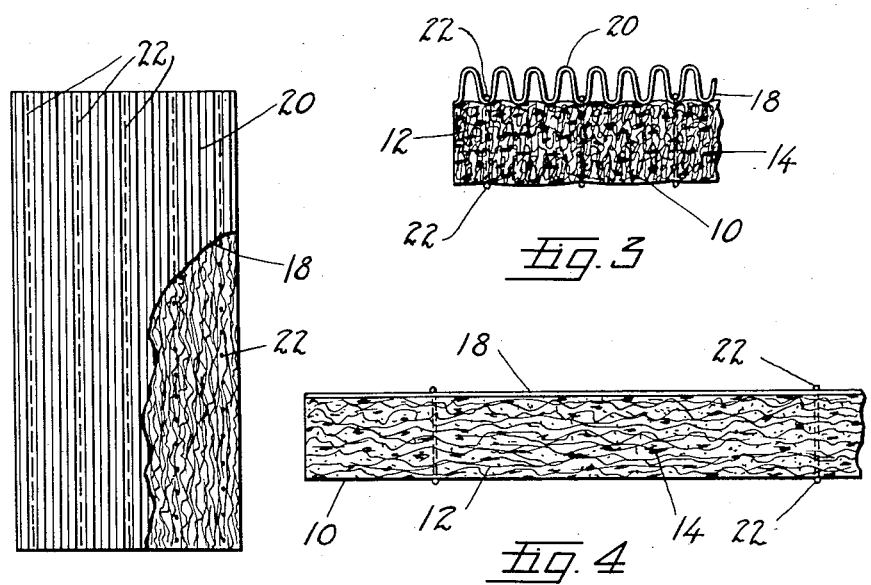

Patented Sept. 2, 1941

2,254,856

UNITED STATES PATENT OFFICE 2,254,856

LAMINATED INSULATION MATERIAL

Meredith S. Randall, Detroit, Mich., assignor to Woodall Industries Incorporated, Detroit, Mich., a corporation of Michigan Application December 6, 1937, Serial No. 178,251

3 Claims. (Cl. 154—44)

My invention relates to improvements in laminated insulation material.

An object is to provide an improved laminated sheet of insulating material comprising a relatively thick layer of light weight soft fluffy compressible sound absorbing wadding having a dense flexible diaphragmatic sheet or layer which may also serve as a back or foundation layer laminated therewith, said two laminations being so formed and secured together as to be capable of substantial extensibility or stretch in one direction without appreciable reduction in thickness of either lamination and without rupture of or detachment of one lamination from the other.

A further object is to provide a laminated structure of the character described characterized in that it may be packed, shipped and stored compressed longitudinally to a length which preferably will not exceed in length one-fourth or one-fifth of the permitted extensible length of the material. When the material is to be used it may be assembled upon the job and secured in the extended state to its supporting structure. It may be extended to varying lengths to fit the dimension of the particular support to which it is to be secured. Therefore sheets of the same size may readily be applied to supports which vary in length.

The connection between the diaphragmatic lamination and the wadding lamination is such that stretching of each is readily permitted without breakage or rupture of such connections.

Other objects, advantages, and meritorious features of my improved structure will more fully appear from the following description, appended claims, and accompanying drawings, wherein:

Figure 1 is a plan of the structure, in its compressed state, embodying my invention, Fig. 2 is a plan of the structure in the extended state, embodying my invention, Fig. 3 is an enlarged side elevation of a fragment of the structure shown in Fig. 1, Fig. 4 is an enlarged side elevation of a fragment of the structure shown in Fig. 2, Fig. 5 is a side elevation of a fragment of a modified form of my construction, Fig. 6 is a side elevation of a fragment of another modified form of my invention, Fig. 7 is a plan of a fragment of a modified form of my invention, Fig. 8 is an enlarged sectional elevation of the structure shown in Fig. 7, taken on line 8—8 of Fig. 7, Fig. 9 is a plan of a fragment of my invention embodying a modified form of diaphragm.

The wadding lamination 10 is made up of a plurality of superimposed filmy plies 12 of loosely integrated cellulose material. Each of these plies is creped in one direction. One type of material which has been found suitable is formed of cellulose fibers carrying an asphalt coating and carrying asphalt composition particles 14. The asphalt particles serve to assist in holding the several plies together. In its normal state a lamination made up of a number of these plies forms a soft loose pad like layer of wadding which is highly absorbent of sound vibrations responding somewhat after the fashion of loose felt to absorb sound.

This material may be compacted in the direction of its length normal to the direction of its creped lines to a compacted dimension which represents only a small fraction of its possible extended or stretched dimension. In other words, the creped ridges extend crosswise of the material. It is possible to compact this material without appreciable increase in either thickness or width to a length which may not be greater than one-fourth or one-fifth of its possible extended length.

It is a purpose of my invention to provide a laminated structure which includes this wadding plus a diaphragm layer, or cover sheet which may be collapsed lengthwise and stretched or extended lengthwise. This cover sheet is tough, flexible, and relatively dense and is so secured to the wadding that the wadding may be compressed and the cover sheet collapsed to relatively small size for packing, storing, or shipping. When it is desired to use the laminated structure the wadding may be stretched out lengthwise and the diaphragm layer also stretched out lengthwise to a length which may equal or exceed four times or more the compacted length of the laminated structure.

The so-called diaphragm layer may also serve as a foundation or backing layer to support the wadding. This backing layer may have a maximum extensible length less than the wadding layer and be connected thereto as described so as to prevent extension of the wadding to the point of unduly thinning it out. This diaphragm layer may be a tough flexible material such as asphalt saturated felt, or such as an asphalt saturated light weight highly flexible tough tissue which may be of one or more laminations. It may be formed of any other suitable material which will provide a tough flexible relatively dense sheet of material that is collapsible lengthwise and thereafter extensible lengthwise. Such layer may be corrugated or fluted so as to facilitate its collapse and extensibility.

The asphalt saturated paper is indicated in the drawings by the numeral 18 and is shown as provided with the corrugations which are identified by the numeral 20 in Fig. 3. Such fluted or corrugated sheet is so secured to the wadding as to permit of its collapse and extensibility along with the compression and extension of the wadding.

One method of effecting such attachment is to stitch the layer 18 to the layer 10 by lines of stitches 22 which stitches are arranged in spaced parallel rows extending parallel to the fluting or corrugations as shown in Figs. 1, 2 and 3 of the drawings. Each row extends parallel to the corrugations 20. As there illustrated, the attachment of the wadding to the corrugated sheet is along the bottoms of spaced apart channels which contact the wadding. The stitched lines may be continuous or they may be discontinuous as in the case of staples. The wadding is so stitched to the corrugated sheet that when a compacted collapsed structure such as shown in Figs. 1 and 3 is stretched the distance between spaced rows of stitches is increased substantially and as shown in Figs. 2 and 4, the maximum extensibility of the structure being limited thereby.

Another satisfactory method of attaching the diaphragm to the wadding is by stitches 23 as shown in Figs. 7 and 8 which stitches extend lengthwise of the material in parallel rows lying on the diaphragm and being anchored at intervals through the wadding as shown in Fig. 8. The stitches are of a length determined by the desired maximum extensibility of the structure. When the structure is compacted lengthwise the portions of the stitches on the outside of the diaphragm are outwardly and lie in loose folds. In this embodiment the diaphragm layer is crinkled so that it collapses readily in the longitudinal compression and is extensible from such collapsed state to the position shown in Figs. 7 and 8.

It is apparent that the structure may be stretched as desired within its limit of stretch. The collapsed diaphragm sheet may have such length and be so secured to the wadding as to afford a protective limit to the maximum extensibility of the wadding under stretch. In use the structure may be secured to a wall that is to be acoustically treated with the wadding juxtaposing the wall surface and the diaphragm layer 18 covering the face of the wadding opposite the face contacting the wall surface. The diaphragm layer 18 being supported by and secured to the wadding will receive the impact of sound waves that normally would strike the wall to which the composite structure is secured, and its vibration period will be modified by the give and take of the wadding against which it rests.

The diaphragm layer may, as illustrated in Fig. 9, be provided with apertures 24 which open up the interior of the wadding to admission of a certain portion of the sound waves so that they will be directly absorbed thereby and another portion will strike the diaphragm and set up a vibration thereof which will be damped out and modified by the backing layer of wadding 10. If desired the diaphragm layer may be a highly polished metal foil which will act also to reflect waves striking thereagainst.

In Fig. 5 an alternative construction is illustrated wherein a diaphragm layer is arranged on each side of the wadding and these diaphragm layers are stitched together through the wadding. In this construction each diaphragm or outer protective layer would be collapsible in the manner herein above described. In this construction one of these diaphragm layers might be relatively impermeable to sound waves and the other layer might be porous and relatively permeable thereto.

Another alternative construction is one wherein layers of wadding are arranged on opposite sides of a diaphragm layer 18 as shown in Fig. 6. This diaphragm layer would also be collapsible as is described in connection with the construction of Fig. 3 and the wadding would be stitched or otherwise secured thereto in a manner similar to that heretofore described. This intermediate diaphragm layer might be permeable or substantially impermeable to sound wave passage. In Figs. 5 and 6 the structure is shown extended.

In each of the modifications illustrated the diaphragm layer is readily collapsible to a length which represents but a small portion of its permitted extended length. The creped wadding is capable of compression or of being compacted in the direction of its length to a dimension which represents an equally small portion of its permitted extended length. The securement of the collapsible diaphragm to the compressible wadding is such that the collapsing and stretching is readily permitted.

Throughout the specification and claims the layer of wadding is described as being compressed or capable of compression in the direction of its length and the diaphragmatic sheet material is described as collapsible in the same direction. While the word "length" as here used would probably in most cases refer to that dimension of the sheet of greatest extent it is not to be considered as so limited. Such word "length" as here used refers to that dimension of the sheet along which it is compressed or compacted or intended to be and along which it may thereafter be stretched or extended regardless of whether such dimension is the long or short dimension of the sheet.

What I claim:

1. A laminated insulation sheet comprising a layer of soft fluffy wadding formed of a plurality of superimposed plies of loosely integrated cellulose material, said plies being individually creased normal to the length of the sheet, said layer being compressed in the direction of its length without appreciable increase in its thickness or width and adapted to be extended in the direction of its length to several times its compressed length without appreciable reduction in its compressed width or thickness, a cover sheet secured to said wadding by stitching extending through the cover sheet and wadding at spaced apart points lengthwise thereof, said cover sheet being collapsed upon itself, when the wadding is compressed, in a succession of fanfolds projecting outwardly away from the layer of wadding and being adapted to elongate simultaneously with the extension of the wadding layer, said cover sheet having a length when extended less than the maximum extensible length of the wadding and adapted to limit the extension of the wadding to that of the cover sheet.

2. The sheet structure defined in claim 1 characterized in that said cover sheet is secured to the layer of wadding by a plurality of rows of stitches, said rows extending crosswise of the sheet and being spaced apart lengthwise thereof.

3. The sheet structure defined in claim 1 characterized in that said cover sheet is secured to the layer of wadding by a plurality of rows of stitches extending lengthwise of the sheet and spaced apart crosswise thereof, the combined length of the stitches in each row having a length less than the maximum extensible length of the wadding and adapted to limit the extension of the wadding to that of the cover sheet.

MEREDITH S. RANDALL.